May 26, 1931.  C. T. PFLUEGER  1,807,433

FISHING REEL

Original Filed June 26, 1924   2 Sheets-Sheet 1

Inventor
Charles T. Pflueger
By Brockett & Hyde
Attorneys

May 26, 1931. C. T. PFLUEGER 1,807,433
FISHING REEL
Original Filed June 26, 1924 2 Sheets-Sheet 2

Inventor
Charles T. Pflueger
By Brockett + Hyde.
Attorneys

Patented May 26, 1931

1,807,433

UNITED STATES PATENT OFFICE

CHARLES T. PFLUEGER, OF AKRON, OHIO, ASSIGNOR TO THE ENTERPRISE MANUFACTURING COMPANY, OF AKRON, OHIO, A CORPORATION OF OHIO

FISHING REEL

Original application filed June 26, 1924, Serial No. 722,497, now Patent No. 1,583,764. Divided and this application filed April 14, 1926. Serial No. 101,964.

This invention relates to improvements in fishing reels, the present application being a division of my patent for Fishing reels, granted May 4, 1926, No. 1,583,764.

The object of the present invention is to provide simple and improved means, and specifically, a single means, for maintaining in proper adjusted position an oil hole closure and a brake actuating member.

Further objects of the invention are in part obvious and in part will appear more in detail hereinafter.

Figure 1:
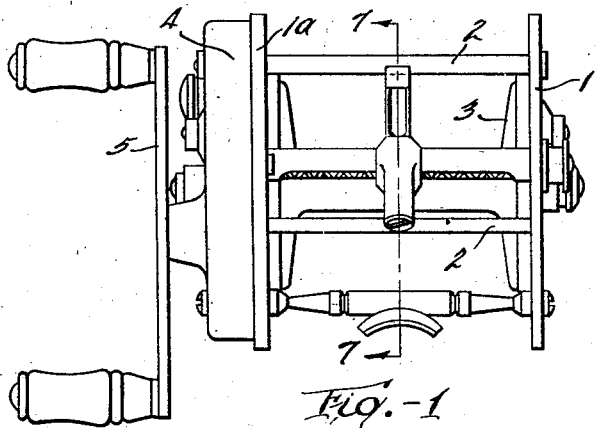
Figure 2:
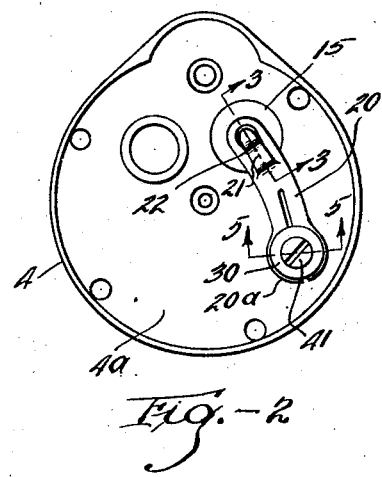
Figures 3, 4:
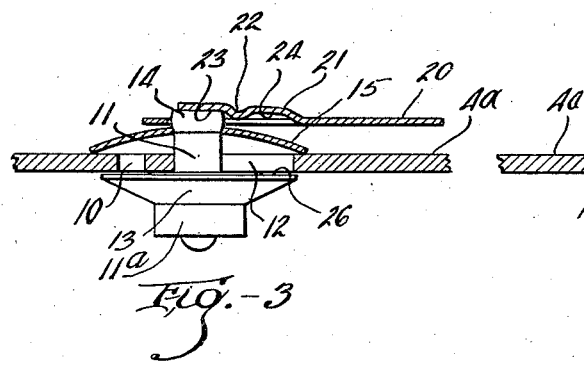
Figure 5:
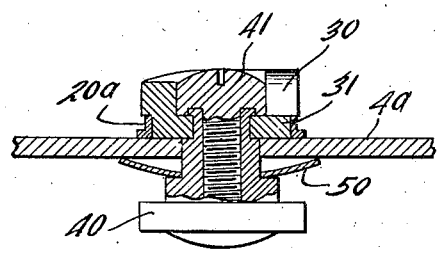
Figure 6:
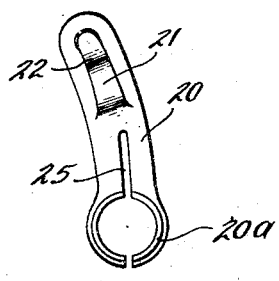
Figure 7:
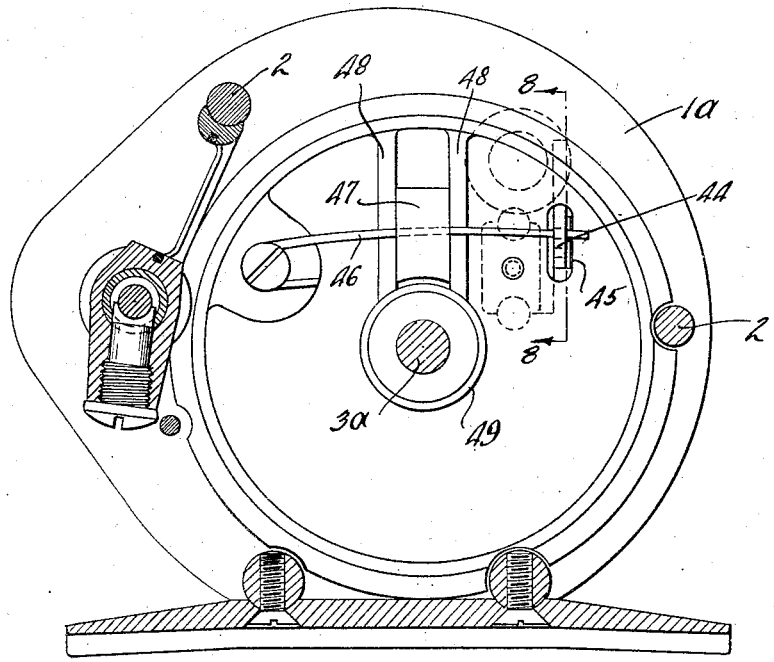
Figure 8:
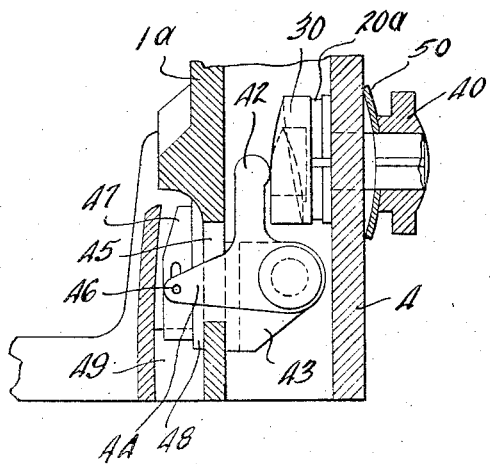

In the drawings, Fig. 1 represents a front elevation of a fishing reel embodying my invention; Fig. 2 is an elevation of the inside of the gear casing; Fig. 3 is a detail sectional view on the line 3—3, Fig. 2; Fig. 4 is a view similar to Fig. 3 but with the oil opening exposed; Fig. 5 is a detail sectional view on the line 5—5, Fig. 2; Fig. 6 is a side elevation of the closure spring member; Fig. 7 is a cross sectional view of the fishing reel on the line 7—7, Fig. 1; and Fig. 8 is a detail sectional view of the braking mechanism on the line 8—8, Fig. 7.

Referring to the drawings, the reel therein illustrated includes the usual end heads 1 and 1a connected by pillars 2 and between which end heads rotates a spool 3, upon which the fishing line is adapted to be wound. The spool is operated by suitable gearing in the casing 4 attached to the end head 1a, said gearing being actuated by the operating handle 5. The substantially circular wall 4a of the gear casing 4 is provided with a suitable aperture 10 through which lubricant may be introduced for lubricating the mechanism within said casing. In order to prevent the escape of the lubricant from said casing as well as the entrance thereinto of dirt and other foreign matter, a suitable closure is provided for said aperture. Said closure comprises a circular member 13 located on the outside of the casing wall and provided with suitable operating means, such as a shank 11 provided on the outside of the casing with a head 11a for manipulation by the fingers, the shank extending through an elongated slot 12 of the casing wall 4a and on the inside thereof being provided with an enlargement 14 which holds in place the friction washer 15 and also serves to interlock the movable parts with a resilient spring later to be described. By application of the fingers to the operating head 11a the closure 13 may be moved back and forth to cover or expose the oil port 10. In the position shown in Fig. 3, the flanged head 13 of the closure covers the oil opening 10, but by sliding the closure to the opposite end of the elongated slot 12, as in Fig. 4, the oil opening is exposed so that the mechanism within the gear casing 4 may be readily lubricated.

In order to insure the maintenance of said closure in proper position, either with the oil opening 10 covered or exposed, a suitable leaf spring 20 is provided. One end of said spring surrounds or is otherwise suitably associated with a cam member forming part of a brake control means, as will later appear, while the free end portion of said spring is adapted to yieldingly engage the headed end 14 of the closure shank, thus tending to move said shank outwardly and the spring washer 15 more firmly into engagement with the gear casing wall.

In the preferred embodiment of the invention, a longitudinally disposed tongue 21 is struck up from the metal of the free end portion of the spring, and said tongue is provided with a centrally disposed, transverse depression 22 which provides two seats or recesses for the headed end 14 of the closure shank. When said headed shank end is in the first or end recess or seat 23, as indicated in Fig. 3, the outer or flanged head 13 of the closure covers the oil opening 10. When the headed shank end 14 is in the second seat or recess 24, however, the closure shank is at the other end of the elongated casing slot 12 and the oil opening is exposed, this being the position of the parts indicated in Fig. 4. If desired, spring 20 may be provided with a longitudinally disposed slot 25, Fig. 6, to increase its resiliency, as will be readily understood.

This spring member 20 not only insures the maintenance of the closure in proper adjusted position, so that there is no liability of the closure accidentally moving over and exposing the oil opening, but the closure is also pressed outwardly, as clearly indicated in Figs. 3 and 4, so that there is but slight, if any, frictional engagement between the flanged closure head 13 and the outer surface of the circular wall 4a of the gear casing. Said wall surface is therefore not marred by sliding movement of the closure. As a further precaution, however, for preventing the marring of said wall surface, the flanged closure head 13 may be provided with an inner marginal recess 26, so that only the central portion of the closure head 13 engages the casing wall surface, and the wall surface area thus engaged is at all times covered or concealed by the closure head, regardless of whether said closure head is covering or exposing the oil opening 10.

As above mentioned, the anchored end of the leaf spring 20 is associated with a cam member which forms part of a brake control means. In the present illustration, the anchored end of said spring is in the form of a split clamping ring, the arms 20a of which snugly surround and frictionally hug a reduced neck or shank portion 31 of a cam member 30, as clearly shown in Fig. 5.

The brake mechanism here illustrated is of the same construction as disclosed in the application of Francis M. Case, for a Fishing reel, filed March 31, 1923, Serial No. 629,040, to which application reference may be had, if desired.

Said brake mechanism includes a rotatable operating member or button 40 for manipulating the cam member 30, said button being arranged outside the gear casing 4 and being secured to said cam member by a screw 41, as clearly indicated in Fig. 5. Said cam member controls or is effective upon one arm 42 of a bell crank lever mounted upon a bracket 43 carried by the reel end head 1a. The other arm 44 of said lever extends through an elongated slot 45 in said end head and has secured thereto one end of a spring wire 46. The other end of said resilient wire is suitably anchored or secured to the reel end head 1a, while the intermediate portion of said wire is provided with a brake member 47, movable radially between guiding flanges 48 into and out of braking engagement with a cylindrical brake drum 49 provided upon one end portion of the spool shaft 3a. It will thus be seen that by manipulating the rotatable button 40, the cam member 30 is operated to oscillate the bell crank lever and thereby move the brake member 47 into and out of braking engagement with the brake drum 49.

As varying degrees of movement of the cam member 30 produces varying degrees of braking effect upon the reel spool, it is apparent that it is quite necessary or desirable to prevent accidental movement of said cam member from the position to which it has been adjusted. By having the leaf spring 20 associated with said cam member in the manner illustrated, such accidental movement of said cam member is effectively prevented. As a further precaution, a spring washer 50 may also be placed beneath the cam manipulating button 40 for frictional engagement with the gear casing wall 4a, though such washer is not really necessary.

A further feature of the present invention resides in the fact that rotary movement of the leaf spring 20 by or with the rotatable brake actuating member 30 is effectively prevented by the engagement of said spring with the oil hole closure, and that sliding movement of said spring by or with said slidable closure is effectively prevented by the engagement of said spring with the brake actuating member.

What I claim is:

1. In a fishing reel, a frame structure, spool operating and controlling mechanism therein, two operating members cooperating with said mechanism, one being slidably and the other rotatably mounted upon said frame structure, and a single means cooperating with both of said operating members and secured to one thereof for maintaining them in adjusted position.

2. In a fishing reel, a frame structure, spool operating and controlling mechanism therein, two operating members cooperating with said mechanism, one being slidably and the other rotatably mounted upon said frame structure, and a single means cooperating with both of said operating members for maintaining them in adjusted position and provided with means by which it is secured to one of said operating members.

3. In a fishing reel, a frame structure, spool operating and controlling mechanism therein, two operating members cooperating with said mechanism, one being slidably and the rotatably mounted upon said frame structure, and a single resilient member having a body portion engaging and effective upon said slidable member and resiliently resisting its adjustment and also provided with arms embracing and resiliently effective upon said rotatable member both for mounting the resilient member upon the rotatable member and for frictionally resisting rotatable adjustment of the latter.

4. In a fishing reel, a frame structure, spool operating and controlling mechanism therein, two operating members cooperating with said mechanism, one being slidably and the other rotatably mounted upon said frame structure, and a single resilient member provided with arms embracing said rotatable member for mounting it thereupon and frictionally engaging the rotatable member to resist its adjustment and also having a body portion interlocked with and frictionally engaging said slidable member for frictionally resisting its adjustment and for also preventing lateral motion of the resilient member about the axis of the rotating adjustment.

In testimony whereof I hereby affix my signature.

CHARLES T. PFLUEGER.